United States Patent Office 3,083,204
Patented Mar. 26, 1963

3,083,204
ESTERS AND AMIDES OF 2-PHENYL-BICYCLO-
(2,2,1)HEPTANE-2-CARBOXYLIC ACID, 2-PHEN-
YL-BICYCLO(2,2,1) - 5-HEPTENE-2-CARBOXYLIC
ACID, 2-PHENYL - BICYCLO(2,2,2)-5-OCTENE-2-
CARBOXYLIC ACID AND 2-PHENYL-BICYCLO-
(2,2,2)OCTANE CARBOXYLIC ACID
Wilfrid Klavehn, Schwetzingen, and Helmut Kraft, Mannheim, Germany, assignors to Knoll A.-G. Chemische Fabriken, Ludwigshafen (Rhine), Germany, a corporation of Germany
No Drawing. Filed June 10, 1957, Ser. No. 664,472
Claims priority, application Germany June 16, 1956
15 Claims. (Cl. 260—292)

The present invention relates to therapeutically valuable basic esters and acid amides and more particularly to basic esters and acid amides derived from 2-phenyl acrylic acid, and to a process of making same.

It is one object of the present invention to provide new and valuable basic esters and amides of carboxylic acids which are derived from 2-phenyl acrylic acid and which possess important therapeutically useful properties, such as spasmolytic and ganglia-blocking properties.

Another object of the present invention is to provide a simple and effective process of converting 2-phenyl acrylic acid into therapeutically valuable esters and amides of new carboxylic acids.

Still another object of the present invention is to provide 2-phenyl bicyclo(2,2,1)heptane-2-carboxylic acid-ω-tertiary amino (lower) alkyl esters which have proved to be valuable therapeutic agents.

A further object of the present invention consists in providing new and valuable 2-bicyclic(2,2,1)heptane-2-carboxylic acid esters with heterocyclic alcohols which possess valuable therapeutic properties.

Other objects of the present invention and advantageous features thereof will become apparent as the description proceeds.

In principle, the valuable basic esters and acid amides according to the present invention are esters and amides of carboxylic acids of the following Formula I

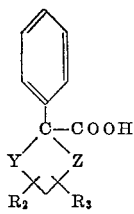

(I)

In said formula

Y and Z, together with the carbon atom to which they are attached, indicate a saturated or an unsaturated monocyclic hydrocarbon radical containing 6 carbon atoms or a saturated or an unsaturated bicyclic hydrocarbon radical containing 7 to 8 carbon atoms while
$R_2$ indicates hydrogen, an alkyl radical and especially a lower alkyl radical, a cycloalkyl radical, an aryl radical and especially a phenyl radical, or an aralkyl radical, and
$R_3$ indicates hydrogen and a lower alkyl radical.

The new basic esters and amides of carboxylic acid of Formula I are obtained by reacting 2-phenyl acrylic acid or its functional derivatives, especially its esters and its nitrile, with a diene hydrocarbon and converting the resulting unsaturated adducts into their basic esters or acid amides or the quaternary ammonium salts of such basic esters, or amides. Such basic esters or amides are prepared by reaction of the resulting new carboxylic acids or their functional derivatives, such as their metal salts, esters, amides, halogenides, with tertiary amino alcohols or tertiary amino alkyl amines, such as dialkylamino alcohols, dialkylamino alkyl amines, or alcohols or amines of heterocyclic compounds having a nitrogen atom in their heterocyclic nucleus. Preferred reaction components are dialkylamino alcohols and dialkylamino alkyl amines wherein the alkyl radicals are low-molecular alkyl radicals.

The preferred tertiary amino alcohols or tertiary aminoalkylamines used for the purpose of the present invention are amino alcohols or aminoalkylamines with 2 or 3 carbon atoms in their alkyl chain.

Double bonds which are present in the alicyclic ring formed by the substituents Y and Z together with the carbon atom to which they are attached, may be hydrogenated either before or after the basic residue is introduced into the molecule.

Reaction of 2-phenyl acrylic acid or its functional derivatives, such as its esters or its nitrile, with diene compounds such as butadiene, isoprene, dimethyl butadiene, phenyl butadiene, cyclopentadiene, cyclohexadiene, α-phellandrene, and the like yields the new class of unsaturated compounds according to the present invention, such as the 1-phenyl-3-cyclohexene-1-carboxylic acids of Formula II, the 2-phenyl bicyclo(2,2,1)-5-heptene-2-carboxylic acid of Formula III, or the 2-phenyl-bicyclo (2,2,2)-5-octene-2-carboxylic acids of Formula IV, wherein $R_2$ and $R_3$ indicate the same substituents as mentioned hereinabove.

(II)

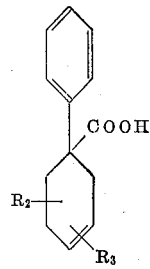

(III)

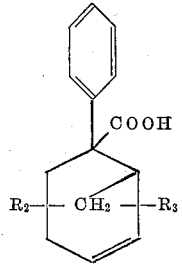

(IV)

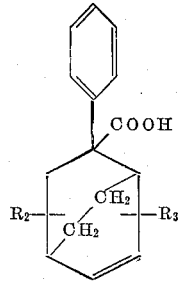

The basic ester components of the new basic esters according to the present invention are residues of tertiary amino alcohols and preferably tertiary amino alcohols which are substituted at their nitrogen atom by low-molecular alkyl radicals, such as dialkylamino ethanols or dialkylamino propanol or residues of heterocyclic alcohols having a nitrogen atom in their heterocyclic nucleus, such as the pyrrolidino, piperidino, morpholino ethanols and propanols or tertiary 4-piperidols, tropinol or the like.

The basic amide components of the new amides of the above mentioned acids are residues of tertiary amino alkylamines which are substituted at their tertiary nitrogen atom by low-molecular alkyl radicals such as dialkylamino ethylamines or dialkylamino propylamines, or diamines, the one nitrogen atom of which is a member of a heterocyclic nucleus, such as pyrrolidino ethylamine, piperidino ethylamine, morpholino ethylamine, or the corresponding propylamines.

According to the present invention either the free acids mentioned hereinabove or their esters or nitriles are used as starting materials in the production of the basic esters or amides.

For instance, the basic esters are obtained by first converting the monocyclic or bicyclic carboxylic acids mentioned hereinabove into their acid halogenides or esters which are then reacted with the above mentioned tertiary amino alcohols. Or the acids or their metal salts can directly be reacted with the corresponding tertiary amino alkyl halogenides to form the desired basic esters.

The basic amides according to the present invention are prepared by first converting the above mentioned carboxylic acids into their acid halogenides or their esters which are then reacted with ammonia or primary amines to form the corresponding amides which are subsequently reacted with tertiary amino alkyl halogenides corresponding to the above mentioned tertiary amino alcohols. The reaction with said tertiary amino alkyl halogenides is preferably carried out in the presence of alkaline agents.

Another method of producing the basic amides consists in reacting the halogenides or esters of the above mentioned carboxylic acids with dialkylamino alkylamines or with diamines wherein one of the nitrogen atoms of said amino groups is a member of a heterocyclic nucleus.

In order to convert the monocyclic or bicyclic carboxylic acid esters into the basically substituted corresponding esters or amides, the starting esters are either directly reacted with the above mentioned tertiary amino alcohols or tertiary amino alkylamines or they are first converted, by saponification, into the free acids which are then reacted, as described hereinabove, to form the corresponding basic compounds according to the present invention. When starting with monocyclic or bicyclic nitriles, they are preferably first converted by saponification, into the free acids and said acids or their esters are then reacted, as described hereinabove, to yield the desired basic esters or amides.

It is also possible and has proved to be of great advantage to first prepare the corresponding basic ester or acid amide of 2-phenyl acrylic acid which is then reacted with a diene hydrocarbon, thereby also producing the desired esters and amides. This simple process of producing the new compounds according to the present invention represents a novel and advantageous method of making said compounds.

Especially valuable compounds obtained according to the present invention are the following compounds:

(1) *2-Phenyl Bicyclo(2,2,1)Heptane-2-Carboxylic Acid Diethylamino Propyl Ester*

This compound is prepared by reacting the acid chloride of 2-phenyl bicyclo(2,2,1)heptane-2-carboxylic acid with γ-diethylamino propanol as described hereinafter in Example 7. The resulting ester has a high antichlorinergic activity and at the same time a highly antagonitsic effect against spasms caused by exposing an isolated piece of the gut of a guinea pig to the action of barium chloride. In this test the new compound is superior to atropine. Especially noteworthy is, furthermore, its high antagonistic effect against nicotine. Its anti-nicotinic activity is superior to and more prolonged than that of the known agents used in the treatment of parkinsonism, such as atropine or the tropine benzohydryl ether methane sulfonate.

(2) *2-Phenyl Bicyclo(2,2,1)Heptane-2-Carboxylic Acid Tropinol Ester*

This compound is obtained by reacting the acid chloride of 2-phenyl bicyclo(2,2,1)heptane-2-carboxylic acid with tropinol as described hereinafter in Example 7. It has a stronger anticholinergic activity than any of the known anticholinergic agents. Furthermore, it differs from other comparable compounds of this type by its high antiphlogistic activity. Therefore, it is a valuable therapeutic agent which has been successfully employed in the treatment of inflammatory skin diseases accompanied by itching, for instance, in the treatment of eczema and the like.

(3) *2-Phenyl Bicyclo(2,2,1)Heptane-2-Carboxylic Acid-N-Methyl-4-Piperidol Ester Metho Sulfate*

This compound is prepared according to Example 7 given hereinafter. It has a noteworthy inhibiting effect upon gastric juice secretion.

Other basic esters and amides according to the present invention possess also valuable therapeutic properties and are, for instance, highly effective spasmolytic, gangliablocking, and the like agents.

The starting materials used for making the basic esters or amides of the new acids of the formua given hereinabove, i.e. the adducts of diene hydrocarbons to 2-phenyl acrylic acid or its functional derivatives, are new and valuable intermediates useful in the preparation of the above mentioned therapeutically active basic esters and amides.

Reaction of 2-phenyl acrylic acid or its functional derivatives with diene compounds is carried out under pressure and at elevated temperature. Preferably a solution of 2-phenyl acrylic acid, its esters, or its nitrile and the diene compound in an inert high-boiling solvent, for instance, an aromatic hydrocarbon, such as xylene, is carried out at a temperature between about 100° C. and 150° C. Heating at a temperature between about 100° C. and about 150° C. and preferably at a temperature of about 135° C. has proved to be especially suitable. Other solvents than xylene may also be used, provided their boiling point is high enough to permit heating to the reaction temperature without the generation of too high a pressure in the autoclave.

Side-reactions, as they are caused by polymerization of the diene compounds or by mixed polymerization of the diene compounds and the 2-phenyl acrylic acid or its derivatives are preferably suppressed by the addition of a suitable inhibitor, such as hydroquinone, diphenylamine, pyrogallol, and other inhibitors known to the art. Preferably the diene synthesis is carried out in a nitrogen atmosphere.

It is quite surprising that the 2-phenyl acrylic acid and its functional derivatives can be subjected to the diene synthesis; for, it is known that said acids and their esters are readily polymerized on heating. They form thereby isatropic acid derivatives, which are unsuitable for diene condensation. Due to their easy polymerizability it could be expected that, on heating the reaction mixture, first such isatropic acid derivatives would be formed and not the desired diene adducts according to the present invention. That the 2-phenyl acrylic acid is readily polymerizable, has been reported, for instance, by Baker and Eccles, "Journ. Chem. Soc. London," vol. 1927, page 2129. Thus, the new diene synthesis according to the present invention represents a novel and entirely unexpected reaction.

The following examples serve to illustrate the present invention, without, however, limiting the same thereto.

The exact constitution of the compounds, obtained according to Examples 2 and 4, has not yet been determined with certainty. The possible positions of the methyl or, respectively, phenyl substituent are indicated in said examples.

EXAMPLE 1

(a) 1-Phenyl-3-Cyclohexene-1-Carboxylic Acid Ethyl Ester

A solution of 380 g. of 2-phenyl acrylic acid ethyl ester and 175 g. of butadiene in 220 cc. of xylene is heated with the addition of 4 g. of hydroquinone in an autoclave at 130° to 150° C. for 12 hours while stirring. After cooling the clear solution of the reaction mixture is heated in a vacuum on a water bath, the solvent is evaporated, and the residue is subjected to fractional distillation in a vacuum by means of a fractionating column. First unreacted 2-phenyl acrylic acid ethyl ester of the boiling point 96° C. to 99° C./4 mm. distills over and is recovered. Thereafter, the reaction product itself, the 1-phenyl-3-cyclohexene-1-carboxylic acid ethyl ester of the formula $C_{15}H_{18}O_2$ distills at 133° C. to 136° C./4 mm. in the form of a colorless refractive oil of pleasant odor.

(b) 1-Phenyl-3-Cyclohexene-1-Carboxylic Acid-β-Diethylamino Ethyl Ester

A solution of 23 g. of said 1-phenyl-3-cyclohexene-1-carboxylic acid ethyl ester in 65 cc. of toluene is gradually added drop by drop to a gently boiling mixture of 17 g. of diethylamino ethanol, 180 cc. of toluene, and 0.2 g. of metallic sodium. The reaction takes place in a three-necked flask provided with a fractionating column and a descending condenser. When no more ethanol distills off, the residue is shaken and extracted with 2 N hydrochloric acid. The basic ester is precipitated from the hydrochloric acid solution by the addition of sodium hydroxide solution and the precipitate is dissolved in ether. The resulting β-diethylamino ethyl ester of 1-phenyl-3-cyclohexene-1-carboxylic acid of the formula $C_{19}H_{27}O_2N$ boils at 133–134° C./0.2 mm. Its hydrochloric melts at 160–161° C. on recrystallization from a mixture of ethanol and ether (1:1).

EXAMPLE 2

(a) 1-Phenyl-3-Methyl-3-Cyclohexene-1-Carboxylic Acid Ethyl Ester or, Respectively, 1-Phenyl-4-Methyl-3-Cyclohexene-1-Carboxylic Acid Ethyl Ester A solution of 380 g. of 2-phenyl arcylic acid ethyl ester and 224 g. of methyl butadiene in 250 cc. of xylene is heated with the addition of 4 g. of hydroquinone in an autoclave at 150° C. for about 12 hours, while stirring. After cooling, the clear solution of the reaction mixture is heated in a vacuum on a water bath. The solvent is evaporated and the residue is subjected to fractional distillation in a vacuum while using a fractionating column. First unreacted 2-phenyl acrylic acid ethyl ester of the boiling point 96° C. to 99° C./4 mm. distills over and is recovered. Thereafter, 1-phenyl-3-methyl-3-cyclohexene-1-carboxylic acid ethyl ester, or, respectively, 1-phenyl-4-methyl-3-cyclohexene-1-carboxylic acid ethyl ester of the formula $C_{16}H_{20}O_2$ is collected; said ester boils at 147° C. to 149° C./4 mm. and is obtained in the form of a faintly yellowish refractive oil.

(b) 1-Phenyl-3-Methyl-3-Cyclohexene-1-Carboxylic Acid-β-Diethylamine Ethyl Ester or, Respectively, 1-Phenyl-4-Methyl-3-Cyclohexene-1-Carboxylic Acid-β-Diethylamino Ethyl Ester A solution of 22.4 g. of the 1-phenyl-3- or, respectively, 4-methyl-3-cyclohexene-1-carboxylic acid methyl ester in 65 cc. of toluene is slowly added drop by drop to the gently boiling mixture of 17 g. of diethylamino ethanol, 180 cc. of toluene, and 0.2 g. of metallic sodium. The reaction is carried out in a three-necked flask provided with a fractionating column and a descending condenser. When no more ethanol distills off, the residue is shaken with 2 N hydrochloric acid, the basic ester is precipitated from the resulting hydrochloric acid solution by the addition of sodium hydroxide solution, and the precipitate is dissolved in ether. The resulting basic ester of the formula $C_{20}H_{29}O_2N$ boils at 155° C. to 161° C./0.15 mm. Its hydrochloride melts, on recrystallization from a mixture of ethanol and ether (1:1), at 139° C. to 140° C.

EXAMPLE 3

(a) 1-Phenyl-3,4-Dimethyl-3-Cyclohexene-1-Carboxylic Acid Ethyl Ester

A solution of 228 g. of 2-phenyl acrylic acid ethyl ester and 114 g. of 2,3-dimethyl butadiene in 200 cc. of xylene is heated with the addition of 2 g. of hydroquinone in an autoclave as described in Example 2. The reaction mixture is worked up by following the procedure of said Example 2. The resulting 1-phenyl-3,4-dimethyl-3-cyclohexene-1-carboxylic acid ethyl ester of the formula $C_{17}H_{22}O_2$ is a faintly colored refractive oil of the boiling point 143° C. to 146° C./4 mm.

(b) 1-Phenyl-3,4-Dimethyl-3-Cyclohexene-1-Carboxylic Acid-β-Diethylamino Ethyl Ester Reacting said 1-phenyl-3,4-dimethyl-3-cyclohexene-1-carboxylic acid methyl ester with diethylamino ethanol by following the procedure described in Example 2, yields 1-phenyl-3,4-dimethyl-3-cyclohexene-1-carboxylic acid-β-diethylamino ethyl ester of the formula $C_{21}H_{31}O_2N$, boiling at 146° C./0.2 mm. Its hydrochloride melts, on recrystallization from the mixture of ethanol and ether (1:1), at 161–162° C.

EXAMPLE 4

(a) 1,5-Diphenyl-3-Cyclohexene-1-Carboxylic Acid Ethyl Ester or, Respectively, 1,2-Diphenyl-3-Cyclohexene-1-Carboxylic Acid Ethyl Ester A solution of 176 g. of 2-phenyl acrylic acid ethyl ester and 130 g. of 1-phenyl butadiene in 200 cc. of xylene is heated in an autoclave with the addition of 1 g. of diphenylamine as described hereinabove in Example 2. The reaction mixture is worked up by following the procedure as described in said Example 2. The resulting 1,5- or, respectively, 1,2-diphenyl-3-cyclohexene-1-carboxylic acid ethyl ester is a viscous, fluorescent oil of the boiling point 198° C. to 200° C./4 mm.

(b) 1,5- or 1,2-Diphenyl-3-Cyclohexene-1-Carboxylic Acid-β-Diethylamino Ethyl Ester On reacting said ester with diethylamino ethanol according to Example 2, 1,5- or, respectively, 1,2-diphenyl-3-cyclohexane-1-carboxylic acid-β-diethylamino ethyl ester of the formula $C_{25}H_{31}O_2N$ is obtained. Its boiling point is 187° to 191° C./0.2 mm.

EXAMPLE 5

(a) 2-Phenyl-Bicyclo(2,2,1)Heptane-2-Carboxylic Acid

A solution of 222 g. of 2-phenyl acrylic acid and 150 g. of cyclopentadiene in 200 cc. of xylene is heated with the addition of 2 g. of hydroquinone in an autoclave at 150° C. for about 12 hours while stirring. After cooling, the reaction mixture is treated with dilute sodium hydroxide solution. The resulting aqueous alkaline solution is separated from the organic solvent layer and is repeatedly extracted with ether. On acidifying the extracted aqueous alkaline solution by the addition of dilute hydrochloric acid, a dark oil precipitates which is dissolved in ether. The ethereal solution is dried oven magnesium sulfate. After evaporating the ether, the residue is catalytically hydrogenated in methanolic solution in the presence of Raney nickel catalyst at room temperature and under pressure and the saturated acid obtained thereby is subjected to fractional distillation after removing the catalyst. 2-phenyl bicyclo(2,2,1)heptane-2-carboxylic acid of the formula $C_{14}H_{16}O_2$ distills in the form of a colorless, viscous oil at a temperature of 168–175° C./4 mm. Said oil completely solidifies in the collecting flask. On recrystallization from hexane, its melting point is 148–149° C.

(b) *2-Phenyl Bicyclo(2,2,1)Heptane-2-Carboxylic Acid-β-Diethylamino Ethyl Ester*

13.5 g. of β-diethylamino ethylchloride are added to the hot solution of 21.6 g. of said acid in 80 cc. of isopropanol. The mixture is boiled under reflux for 8 hours. After cooling and addition of anhydrous ether, the hydrochloride of 2-phenyl bicyclo(2,2,1)heptane-2-carboxylic acid-β-diethylamino ethyl ester of the formula $C_{20}H_{29}O_2N$ crystallizes. Its melting point is 171–173° C., on recrystallization from a mixture of ethanol and ether (1:1).

EXAMPLE 6

*2-Phenyl Bicyclo(2,2,1)-5-Heptene-2-Carboxylic Acid-β-Diethylamino Ethyl Ester*

A solution of 486 g. of 2-phenyl acrylic acid methyl ester and 298 g. of cyclopentadiene in 300 cc. of xylene is reacted with the addition of 5 g. of hydroquinone as described in Example 2. The reaction mixture is worked up by following the procedure also described in said Example 2. The resulting 2-phenyl bicyclo(2,2,1)-5-heptene-2-carboxylic acid methyl ester of the formula $C_{15}H_{16}O_2$ is a colorless oil which boils at 140–142° C./3 mm.

Reaction of said ester with diethylamino ethanol as described hereinabove in Example 2 yields 2-phenyl bicyclo(2,2,1)-5-heptene-2-carboxylic acid-β-diethylamino ethyl ester of the formula $C_{20}H_{27}O_2N$ boiling at 155–156° C./0.3 mm. Its hydrochloride melts, on recrystallization from a mixture of ethanol and ether (1:1), at 168–170° C. Its methosulfate of formula $C_{22}H_{33}NO_6S$ melts, on recrystallization from a mixture of acetone and acetic acid ethyl ester (1:1), at 85–90° C.

Hydrogenation of 2-phenyl bicyclo(2,2,1)-5-heptene-2-carboxylic acid methyl ester in methanolic solution with the addition of Raney nickel catalyst at room temperature and at a pressure of 100 atm. gauge yields the saturated 2-phenyl bicyclo(2,2,1)heptane-2-carboxylic acid methyl ester of the formula $C_{15}H_{18}O_2$ in the form of a colorless oil which boils at 108–112° C./0.4 mm.

Reacting said 2-phenyl bicyclo(2,2,1)heptane-2-carboxylic acid methyl ester with the following tertiary β-amino ethanols as described hereinabove in Example 2, yields the following basic esters:

phenyl bicyclo(2,2,1)-5-heptene-2-carboxylic acid ethyl ester of the formula $C_{16}H_{18}O_2$ is a colorless refractive oil of the boiling point 140–146° C./4 mm.

Hydrogenation of said ester in methanolic solution by the addition of Raney nickel catalyst at room temperature and at a pressure of 100 atm. gauge yields the saturated ethyl ester of the formula $C_{16}H_{20}O_2$ in the form of a colorless oil which boils at 125–127° C./3 mm.

A solution of 192 g. of said ester in 1500 cc. of a 15% methanolic potassium hydroxide solution is boiled under reflux for 12 hours. The solution is concentrated by evaporation in a vacuum. 500 cc. of water are added to the residue. On acidifying the mixture with hydrochloric acid, the free acid is obtained which melts at 148–149° C., on recrystallization from hexane.

60 g. of said acid are boiled under reflux with 100 g. of thionylchloride for 16 hours. After distilling off excess thionylchloride, the corresponding acid chloride of the formula $C_{14}H_{15}OCl$ boiling at 164–170° C./14 mm., is obtained.

A solution of 35.2 g. of said acid chloride and 44.5 g. of N-methyl-4-piperidol in 100 cc. of toluene is boiled under reflux for 12 hours. 200 cc. of water are added to the reaction mixture. The organic solvent layer is repeatedly shaken with water and then extracted with 2-N hydrochloric acid. The base is precipitated from the acid extracts by the addition of sodium hydroxide solution and is dissolved in ether. From the ethereal solution there is obtained the 2-phenyl bicyclo(2,2,1)heptane-2-carboxylic acid-N-methyl-4-piperidol ester of the formula $C_{20}H_{27}O_2N$ which boils at 140–142° C./0.1 mm. and which, on recrystallization from ligroin, melts at 86–88° C. Its hydrochloride melts, on recrystallization from a mixture of ethanol and ether (1:1), at 200° C.

To produce therefrom the methosulfate, 3.7 g. of dimethylsulfate are added to a solution of 8.7 g. of said basic ester in 10 cc. of acetic acid ethyl ester while cooling with ice. The quaternary ammonium salt crystallizes after a short period of time. It corresponds to the formula $C_{22}H_{23}O_6NS$ and melts, on recrystallization from a mixture of acetic acid ethyl ester and ethanol (1:1), at 167–168° C.

By reacting tropinol with the acid chloride in the same manner as described hereinabove for the reaction with N-methyl-4-piperidol, there is obtained the tropinol ester of the formula $C_{22}H_{29}O_2N$ which boils at 198–199° C./4 mm. Its hydrochloride melts, on recrystallization from

| Reaction with— | Basic Ester | | | Derivatives |
| --- | --- | --- | --- | --- |
| | Formula | Boiling Point | Melting Point of Hydrochloride | |
| β-Dimethylamino ethanol | $C_{18}H_{25}O_2N$ | 167–170° C. (5 mm.) | 181–182° C. (from ethanol/ether). | |
| β-Diethylamino ethanol | $C_{20}H_{29}O_2N$ | 174–180° C. (3 mm.) | 171–173° C. | Methosulfate $C_{22}H_{35}NO_6S$. Melt. Pt. 75–78° C. (from acetic acid ethyl ester). |
| β-Diethylamino ethoxy ethanol | $C_{22}H_{33}O_3N$ | 170–175° C. (0.3 mm.) | | |
| β-Piperidino ethanol | $C_{21}H_{29}O_2N$ | 204–210° C. (8 mm.) | 175–176° C. (from ethanol/ether). | |
| β-Morpholino ethanol | $C_{20}H_{27}O_3N$ | 215–220° C. (5 mm.) | 178–179° C. (from ethanol/ether). | |
| β-Pyrrolidino ethanol | $C_{20}H_{27}O_2N$ | 155–160° C. (0.2 mm.) | 145° C. (from ethanol/ether). | Picrate: Melt. Pt. 143–150° C. (from ethanol). |

EXAMPLE 7

*2-Phenyl Bicyclo(2,2,1)Heptane-2-Carboxylic Acid-N-Methyl-4-Piperidol Ester*

A solution of 380 g. of 2-phenyl acrylic acid ethyl ester and 220 g. of cyclopentadiene in 250 cc. of xylene to which solution 4 g. of hydroquinone are added is reacted as described hereinabove in Example 2. The reaction mixture is worked up following the procedure described in detail in said Example 2. The resulting 2- a mixture of ethanol and ether (1:1), at 224° C. Its methosulfate of the formula $C_{24}H_{35}O_6NS$ melts, on recrystallization from a mixture of ethanol and acetic acid ethyl ester (1:1), at 215–216° C.

On reacting said acid chloride with γ-diethylamino propanol, the corresponding γ-diethylamino propyl ester of the formula $C_{21}H_{31}O_2N$ is obtained. Its boiling point is 159–164° C./0.2 mm. Its hydrochloride melts, on recrystallization from ethanol, at 150–151° C.

On reacting said acid chloride with N-ethyl piperidol, 2-phenyl bicyclo(2,2,1)heptane-2-carboxylic acid-N-ethyl-4-piperidol ester of the formula $C_{21}H_{29}O_2N$ is obtained. Said ester boils at 165–168° C./0.3 mm. Its hydrochloride melts, on recrystallization from a mixture of ethanol and ether (1:1), at 176–177° C. Its methosulfate of the formula $C_{23}H_{35}O_6NS$ melts, on recrystallization from a mixture of acetic acid ethyl ester and ethanol (1:1), at 143–144° C.

On reacting said acid chloride with β-isoocetenyl methylamino ethanol, there is obtained in an analogous manner as described hereinabove, the β-(2-methyl-2-heptenyl-6)-methylamino ethanol ester of 2-phenyl bicyclo(2,2,1)heptane-2-carboxylic acid of the formula $C_{25}H_{37}O_2N$ boiling at 189–192° C./0.2 mm.

EXAMPLE 8

*2-Phenyl Bicyclo(2,2,1)Heptane-2-Carboxylic Acid-β-Diethylamino Ethylamide*

A solution of 153 g. of 2-phenyl acrylonitrile and 118 g. of cyclopentadiene in 120 cc. of xylene to which 2 g. of hydroquinone are added, is condensed as described hereinabove in Example 2. The reaction mixture is worked up by following the procedure also described in said Example 2. The resulting 2-phenol-2-cyano bicyclo-(2,2,1)heptene of the formula $C_{14}H_{13}N$ is a viscous oil of the boiling point 168–170° C./4 mm. It is converted by hydrogenation at room temperature and at atmospheric pressure in the presence of a platinum catalyst into the saturated 2-phenyl-2-cyano bicyclo(2,2,1)heptane. The solution of 150 g. of said nitrile in 175 cc. of ethanol and 120 cc. of 50% potassium hydroxide solution is heated in an autoclave at 150° C. for 8 hours. 250 cc. of water are added to the reaction mixture. The ethanol is removed by distillation in a vacuum and the alkaline solution is acidified by the addition of hydrochloric acid. Thereby, the free 2-phenyl bicyclo(2,2,1)heptane-2-carboxylic acid of the melting point 148–149° C. precipitates.

By following the procedure, described hereinabove in Example 7, the corresponding acid chloride is prepared by reacting said acid with thionylchloride.

A solution of 23.5 g. of the resulting acid chloride in 100 cc. of toluene is boiled under reflux with 23.2 g. of diethylamino ethylamine for 12 hours. After cooling, the reaction mixture is repeatedly shaken and extracted with 2-N hydrochloric acid. The acid extracts are neutralized by the addition of sodium hydroxide solution whereby 2 - phenyl bicyclo(2,2,1)heptane - 2 - carboxylic acid-β-diethylamino ethylamide precipitates. It is dissolved in ether and is purified by fractional distillation. Its boiling point is 176–179° C./0.3 mm. Its hydrochloride melts, on recrystallization from ethanol, at 193–194° C.

EXAMPLE 9

*(a) 2-Phenyl Bicyclo(2,2,1)-5-Heptene-2-Carboxylic Acid Diethylamino Ethyl Ester*

A solution of 69.5 g. of 2-phenyl acrylic acid-β-diethylamino ethyl ester and 30 g. of cyclopentadiene in 30 cc. of xylene to which solution 0.2 g. of diphenylamine are added, is condensed in an analogous manner as described hereinabove, in Example 2. The reaction mixture is extracted with dilute hydrochloric acid and, thereby, the basic reaction product is separated. On addition of dilute potassium hydroxide solution to the acid aqueous extracts, a dark basic oil precipitates which is subjected to fractional distillation in a vacuum. Thereby, 2-phenyl-bicyclo(2,2,1)heptene-2-carboxylic acid diethylamine ethyl ester of the formula $C_{20}H_{27}O_2N$ is obtained. Said ester is a colorless oil of a weakly basic odor which boils at 152–155° C./0.3 mm. Its hydrochloride melts, on recrystallization from a mixture of ethanol and ether (1:1) at 168–170° C.

*(b) 2-Phenyl Bicyclo(2,2,1)Heptane-2-Carboxylic Acid-β-Diethylamino Ethyl Ester*

Said unsaturated ester is dissolved in methanol and is hydrogenated in the presence of Raney nickel catalyst under pressure at room temperature. Thereby the corresponding saturated basic ester of the formula $C_{20}H_{29}O_2N$ is obtained in the form of a colorless oil which boils at 164–166° C./0.8 mm. Its hydrochloride melts, on recrystallization from a mixture of ethanol and ether (1:1), at 171–173° C.

EXAMPLE 10

*2-Phenyl Bicyclo(2,2,2)-5-Octene-2-Carboxylic Acid-β-Diethylamino Ethyl Ester*

A solution of 264 g. of 2-phenyl acrylic acid ethyl ester and 128 g. of cyclohexadiene in 200 cc. of xylene is heated in an autoclave with the addition of 2.5 g. of hydroquinone as described hereinabove in Example 2. The reaction mixture is worked up by following the procedure also described in said Example 2. The resulting 2-phenyl bicyclo (2,2,2)-5-octene-2-carboxylic acid ethyl ester of the formula $C_{17}H_{20}O_2$ is a viscous refractive oil of the boiling point 163–164° C./4 mm.

On reacting said ester with β-diethylamino ethanol as described hereinabove in Example 2, 2-phenyl bicyclo (2,2,2)-5-octene-2-carboxylic acid-β-diethylamino ethyl ester of the formula $C_{21}H_{29}O_2N$, is obtained. Said ester boils at 153–154° C./0.2 mm. Its hydrochloride melts, on recrystallization from a mixture of ethanol and ether (1:1) at 142–143° C.

EXAMPLE 11

*2-Phenyl-7-Isopropyl-6-Methyl Bicyclo(2,2,2)Octane-2-Carboxylic Acid-β-Diethylamino Ethyl Ester*

A solution of 380 g. of 2-phenyl acrylic acid ethyl ester and 4-isopropyl-1-methyl-2,6-cyclohexadiene in 250 cc. of xylene is condensed with the addition of 4 g. of hydroquinone as described hereinabove in Example 2. The reaction mixture is worked up by following the procedure also described in said Example 2. The resulting 2-phenyl-7-isopropyl-6-methyl bicyclo(2,2,2)-5-octene-2-carboxylic acid ethyl ester of the formula $C_{21}H_{28}O_2$ boils at 179–181° C./4 mm. It is a viscous refractive oil.

On hydrogenation of said ester in methanolic solution and in the presence of Raney nickel catalyst as described hereinabove in Example 6, the corresponding saturated ester of the formula $C_{21}H_{30}O_2$ and the boiling point 176–178° C./4 mm. is obtained. On saponifying said ester as described hereinabove in Example 7, the free 2-phenyl-7-isopropyl - 6-methyl bicyclo(2,2,2)octane - 2 - carboxylic acid of the formula $C_{19}H_{26}O_2$ is prepared. Said acid boils at 165–170° C./0.6 mm. and has a melting point of 135° C. on recrystallization from a mixture of methanol and water (1:1).

28.6 g. of said acid are added to a solution of 2.3 g. of metallic sodium in 160 cc. of isopropanol. 17.2 g. of β-diethylamino ethylchloride hydrochloride are added to said solution. The reaction mixture is boiled under reflux for 8 hours. The precipitated sodium chloride is removed by filtration and the filtrate is concentrated by evaporation in a vacuum on a water bath. The residue is dissolved in water and the basic ester is precipitated from the resulting aqueous solution by the addition of potassiume carbonate solution. The precipitated β-diethyl amino ethyl ester of 2-phenyl-7-isopropyl-6-methyl bicyclo (2,2,2)octane-2-carboxylic acid of the formula $C_{25}H_{39}O_2N$ is an almost odorless, viscous, refractive oil of the boiling point 206–209° C./3 mm. Its hydrochloride is highly hygroscopic.

In place of 2-methylbutadiene and 2,4-dimethylbutadiene as they are used as diene compounds in Examples 2 and 3, there may be employed equimolecular amounts of butadiene compounds containing other alkyl radicals. The cyclopentadiene and the cyclohexadiene compounds used in the preceding examples may also be replaced by equimolecular amounts of other alkyl, cycloalkyl, aryl, and aralkyl substituted cyclopentadiene and cyclohexadiene compounds. Otherwise the procedure is the same as that described in the examples given hereinabove. However, the compounds prepared according to said examples and especially the cyclopentadiene reaction products of Examples 5, 6, and 7, have proved to be of special value.

In place of the diethylamino and dimethylamino ethyl and propyl alcohols or ethyl and propyl halogenides used in the examples, there may be employed equimolecular amounts of other tertiary amino alcohols and amino alkyl halogenides.

In place of the hydrochlorides there may be prepared other acid addition salts with inorganic or organic acids such as the hydrobromides, sulfates, phosphates, amidosulfonates, acetates, citrates, tartrates, benzoates, malates, and the like provided the acid components of such acid addition salts are tolerated by the human body in the concentration in which they are administered.

Likewise, in place of the methosulfates, there may be prepared other quaternary ammonium compounds of the new basic esters and amides such as the alkochlorides, the alkobromides, the alkyl toluene sufonates, and others.

As stated hereinabove, compounds of the following groups are especially valuable compounds:

(a) 2-phenyl bicyclo(2,2,1)heptane-2-carboxylic acid-ω-tertiary amino alkyl esters such as the 2-phenyl bicyclo-(2,2,1)heptane - 2 - carboxylic acid diethylamino propyl ester of Example 7.

(b) 2 - phenyl bicyclo(2,2,1)heptane-2-carboxylic acid esters with heterocyclic alcohols and especially the 2-phenyl bicyclo(2,2,1)heptane-2-carboxylic ester tropinol ester and the 2-phenyl bicyclo(2,2,1)heptane-2-carboxylic acid N-methyl-4-piperidol ester in the form of its methosulfate.

The basic esters or amides according to the present invention are administered orally or parenterally. Preferably they are not used in their original form but diluted, thus allowing better and more economical use to be made thereof. They are preferably administered orally in the form of shaped solid preparations of their salts or quaternary ammonium compounds such as the hydrochlorides or the methosulfates. Suitable forms for oral administration are tablets, pills, dragees, capsules or the like shaped preparations. Solutions, emulsions, suspensions, dispersions, or similar forms of application may, of course, also be used.

In the case of powders, a fine dispersion of the active compound is of importance. Such a fine dispersion can be achieved, for instance, by intimately mixing and milling the compound in a ball mill with a solid, pulverulent extending agent, to the desired degree of fineness or by impregnating the already milled, finely powdered, solid carrier with a mixture of the active compound in water or any other suitable solvent and then removing the water or solvent.

When preparing tablets, pills, powders, and the like preparations to be used in human therapy, commonly used diluting agents, binders, lubricants, and other tableting adjuvants are employed, such as sugar, lactose, talcum, starch, bolus alba, pectin, as binders gelatin, gum arabic, methyl cellulose, yeast extract, agar, tragacanth, and as lubricants stearic acid, magnesium stearate, and others. The content of active compounds in such preparations may vary. It is, of course, necessary that the active compound be present in such an amount that a suitable dosage will be ensured. Ordinarily the preparation should not contain less than 1 mg. of the active compound. The preferred amount of the active compound to be employed is between 0.1% and 1% of the preparation. To use greater amounts is also possible, although administration of the suitable dose becomes more difficult. Tablets containing, for instance, between about 1 mg. and about 5 mg. and preferably about 2 mg. of the active compound per tablet have proved to be especially suitable. Such tablets of 2-phenyl bicyclo(2,2,1)heptane - 2 - carboxylic acid diethylamino propyl ester have successfully been used in therapy.

The tropinol ester of 2-phenyl bicyclo(2,2,1)heptane-2-carboxylic acid, which is noteworthy by its remarkable antiphlogistic activity, is preferably used in the form of an ointment for the treatment of inflammatory skin diseases. Ointments containing about 0.5% of said compound in an ointment base known to the art by the trademark "Eucerin" has proved to be especially suitable. Said "Eucerin" base consists of emulsified wool fat alcohols with 2% of cholesterol and aliphatic hydrocarbons, such as Vaseline or paraffin, mixed and emulsified with water.

Of course, many changes and variations in the 2-phenyl acrylic acid starting material, the diene compounds, the solvents, the polymerization inhibitors, the hydrogenation catalysts used, in the reaction conditions, temperature, duration, pressure, in the intermediate acids and acid derivatives such as esters, nitriles, chlorides, and the like employed, in the basically substituted reaction components, in the methods of isolating, working up, and purifying the reaction products and converting them into their acid addition salts and their quaternary ammonium compounds, in the manner of therapeutically administering the new compounds and of preparing therapeutically effective preparations, and the like may be made by those skilled in the art in accordance with the principles set forth herein and in the claims annexed hereto.

We claim:
1. The 2-phenyl bicyclo(2,2,1)heptane-2-carboxylic acid-γ-diethylamino propyl ester.
2. The 2-phenyl bicyclo(2,2,1)heptane-2-carboxylic acid tropinol ester.
3. The 2-phenyl bicyclo(2,2,1)heptane-2-carboxylic acid-N-methyl-4-piperidol ester methosulfate.
4. 2-phenyl bicyclo(2,2,1)heptane-2-carboxylic acid lower alkyl esters of the formula

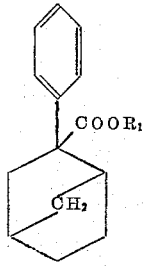

wherein $R_1$ is a lower alkyl radical.
5. The 2-phenyl bicyclo(2,2,1)heptane-2-carboxylic acid chloride of the formula

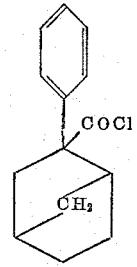

6. The 2-phenyl-2-cyano bicyclo(2,2,1)heptane of the formula

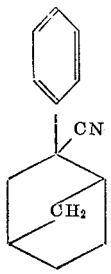

7. 2-phenyl bicyclo(2,2,1)-5-heptene-2-carboxylic acid of the formula

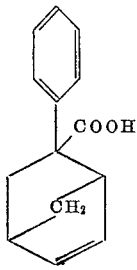

8. 2-phenyl bicyclo(2,2,1)heptane-2-carboxylic acid of the formula

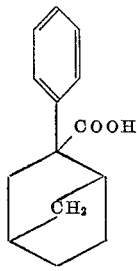

9. The 2-phenyl bicyclo(2,2,1)heptane-2-carboxylic acid pyrrolidino ethyl ester.
10. The 2-phenyl bicyclo(2,2,1)heptane-2-carboxylic acid N-lower alkyl-4-piperidol esters.
11. Lower alkyl esters of 2-phenyl bicyclo(2,2,1)-5-heptene-2-carboxylic acid.
12. 2-phenyl bicyclo(2,2,2)octane-2-carboxylic acid.
13. Di-(lower alkyl)amino lower alkyl esters of 2-phenyl bicyclo(2,2,1)heptane-2-carboxylic acid.
14. Lower alkyl esters of 2-phenyl bicyclo(2,2,2)-5-octene-2-carboxylic acid.
15. In a process of producing carboxylic acid compounds of the formula

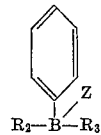

wherein
B is a member selected from the group consisting of the bicyclo(2,2,1)heptane ring and the bicyclo(2,2,2)octane ring;
Z is a member attached to the 2-carbon atom of said bicyclic ring B to which the phenyl radical is attached, said member Z being selected from the group consisting of the carboxylic acid group —COOH, the carboxylic acid lower alkyl ester group, the carboxylic acid piperidol ester group, the carboxylic acid N-lower alkyl-4-piperidol ester group, the carboxylic acid tropinol ester group, the carboxylic acid ω-amino lower alkyl ester group of the formula

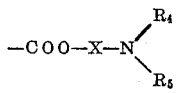

wherein
X is an alkylene radical having 2 to 3 carbon atoms, and
$R_4$ and $R_5$ are members selected from the group consisting of lower alkyl radicals and, together with the nitrogen atoms to which they are attached, the piperidyl, morpholinyl, and pyrrolidyl radicals; and
the carboxylic acid ω-amino lower alkyl amide group of the formula

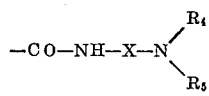

wherein
X, $R_4$, and $R_5$ represent the same members as indicated above; and
$R_2$ and $R_3$ indicate members selected from the group consisting of hydrogen and a lower alkyl radical;
the steps which comprise heating a phenyl acrylic acid compound of the formula

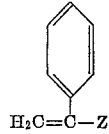

wherein Z is the same member as indicated above, with a diene compound selected from the group consisting of cyclopentadiene, cyclohexadine, and lower alkyl substituted cyclopentadienes and cyclohexadienes in the presence of a polymerization inhibitor in a solution in an inert solvent and under pressure and hydrogenating the double bond in the resulting bicyclo-alkene compound.

References Cited in the file of this patent
UNITED STATES PATENTS

| | | |
|---|---|---|
| 2,404,588 | Martin | July 23, 1946 |
| 2,704,284 | Weston | Mar. 15, 1955 |

FOREIGN PATENTS

| | | |
|---|---|---|
| 249,054 | Switzerland | Mar. 16, 1948 |